(12) United States Patent
Ling et al.

(10) Patent No.: US 7,496,914 B1
(45) Date of Patent: Feb. 24, 2009

(54) AUTOMATIC NETWORK SEARCH, DATA DOWNLOAD, AND STORAGE WRITE SYSTEM

(75) Inventors: Mike T. Ling, Frement, CA (US); Tseng Chiung Ni, Frement, CA (US)

(73) Assignee: Intervideo, Inc., Frement, CA (US)

( * ) Notice: Subject to any disclaimer, the term of this patent is extended or adjusted under 35 U.S.C. 154(b) by 572 days.

(21) Appl. No.: 10/959,044

(22) Filed: Oct. 7, 2004

(51) Int. Cl.
*G06F 9/445* (2006.01)

(52) U.S. Cl. .................. 717/178; 717/175; 717/176; 717/177

(58) Field of Classification Search .............. 717/178, 717/175, 176, 177; 709/219, 217, 203
See application file for complete search history.

(56) References Cited

U.S. PATENT DOCUMENTS

| | | | |
|---|---|---|---|
| 6,167,567 A * | 12/2000 | Chiles et al. ............... 717/173 |
| 6,347,398 B1 * | 2/2002 | Parthasarathy et al. ...... 717/178 |
| 6,366,907 B1 * | 4/2002 | Fanning et al. ............. 709/217 |
| 6,606,744 B1 * | 8/2003 | Mikurak ..................... 717/178 |
| 6,742,023 B1 * | 5/2004 | Fanning et al. ............. 709/219 |
| 6,802,061 B1 * | 10/2004 | Parthasarathy et al. ...... 717/178 |
| 7,043,644 B2 * | 5/2006 | DeBruine ................... 713/153 |
| 7,047,406 B2 * | 5/2006 | Schleicher et al. .......... 713/168 |
| 7,065,579 B2 * | 6/2006 | Traversat et al. ............ 709/225 |
| 7,099,993 B2 * | 8/2006 | Keeler ....................... 711/113 |
| 7,165,071 B2 * | 1/2007 | Fanning et al. ............. 709/217 |
| 7,188,342 B2 * | 3/2007 | DeMello et al. ............. 717/173 |
| 2002/0100037 A1 * | 7/2002 | Kitagawa .................... 717/174 |

OTHER PUBLICATIONS

Lui, et al. "Interoperability of Peer-To-Peer File Sharing Protocols", 2001, ACM, p. 25-33.*
Chawathe, et al. "Making Gnutella-like P2P Systems Scalable", 2003, ACM, p. 407-418.*
Lui, et al. "Interoperability of Peer-To-Peer File Sharing Protocols", 2001, ACM, p. 25-33.*
Storm, T. "Continuous Release and Upgrade of Component-Based Software", 2005, ACM, p. 43-57.*

* cited by examiner

*Primary Examiner*—Wei Y Zhen
*Assistant Examiner*—Qamrun Nahar
(74) *Attorney, Agent, or Firm*—Rosenberg, Klein & Lee

(57) ABSTRACT

An automatic search, download, and write to storage system comprising setting up download criteria, searching a network for data according to the download criteria, downloading data matching the download criteria, and writing the downloaded data to a storage device or medium. Once the download criteria are established, the remaining processes from searching to writing occur automatically. The download criteria act as a preference or filter to identify appropriate data. Multiple preferences or download criteria can be batched processed. Furthermore, the system can be activated and searching, downloading, and writing completed by a single click.

30 Claims, 6 Drawing Sheets

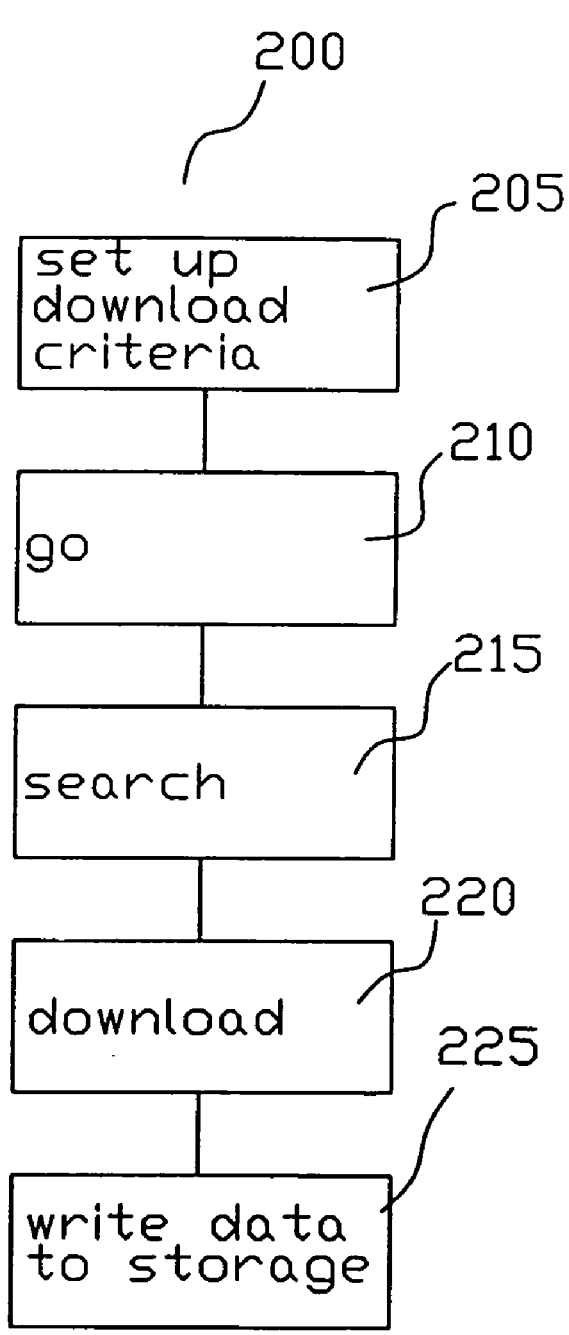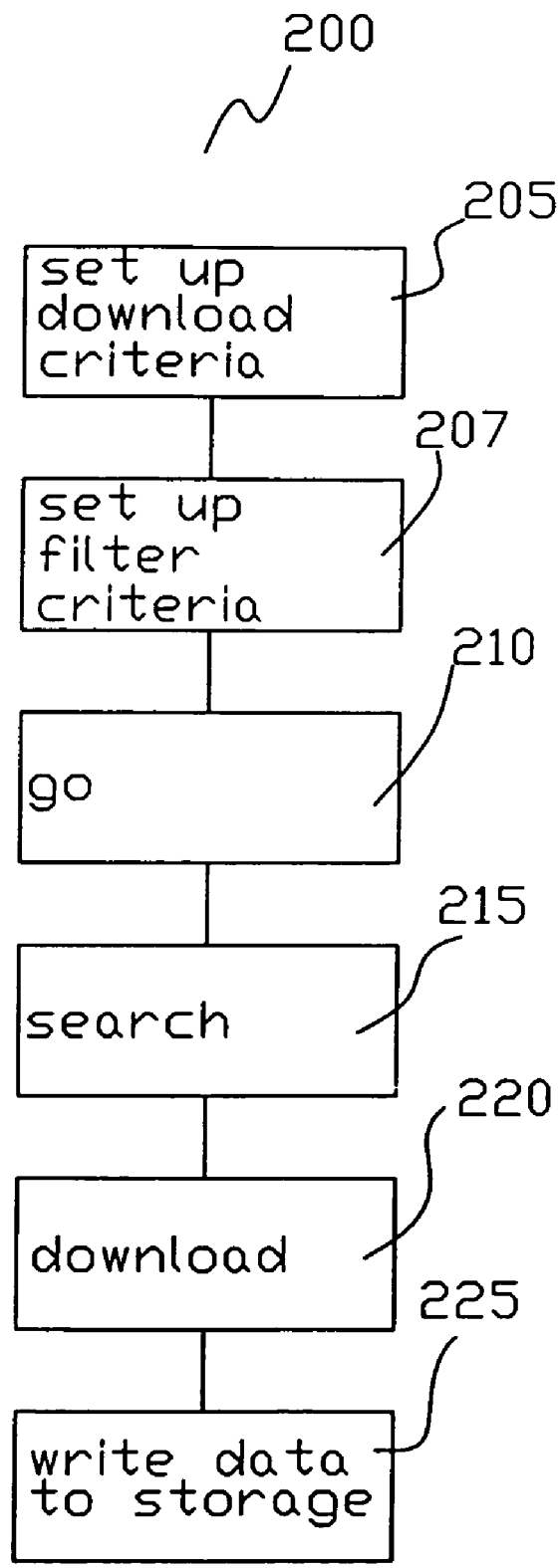
FIG.2A
FIG.2B pre-set filter criteria: _____
URL 1: _____
URL 2: _____
URL 3: _____
-----
URL N: _____
file name: _____
keywords: _____
author: _____
media types: _____
maximum file size: _____
minimum file size: _____
reformat to file type: _____
keywords count: _____
database count: _____
storage: _____
total max data: _____
min remaining storage: _____ scheduled start: _____
mirror: _____
levels: _____

[filter] [go] [save as pre-set] [cancel]

AUTOMATIC NETWORK SEARCH, DATA DOWNLOAD, AND STORAGE WRITE SYSTEM

BACKGROUND OF THE INVENTION

1. Field of the Invention

The present invention relates to data downloading system. More specifically, the present invention discloses a system for automatically searching a network, downloading data according to defined preferences, and automatically writing the downloaded data to a storage system.

2. Description of the Prior Art

The Internet is an increasingly useful source of information and entertainment. Users can browse the Internet and find information regarding their hobbies or interests. Additionally, they can view or listen to multimedia content contained in a website.

Unfortunately, a disadvantage of the Internet is that a user must stay at a fixed location while using the Internet. For example, if a user connects to the Internet via a desktop computer, the user must sit in front of the computer in the same location while utilizing the Internet.

Furthermore, users are becoming more and more concerned with saving time and adding convenience in their daily lives.

However, the immobile nature of the Internet results in poor portability. Additionally, users can spend a lot of time trying to find appropriate information, which wastes their time.

Therefore, there is need for a system that allows users to automatically search a network, download data, and write the data to a storage device.

SUMMARY OF THE INVENTION

To achieve these and other advantages and in order to overcome the disadvantages of the conventional method in accordance with the purpose of the invention as embodied and broadly described herein, the present invention provides an automatic search, download, and write to storage system.

The automatic search, download, and write to storage system of the present invention basically comprises a download criteria module, a network search module, a download module, and a write to storage module.

The download criteria module comprises settings or preferences to define what data is to be downloaded. For example, users can choose to download data according to their hobbies, business, interests, etc. Also the type of data to be downloaded can be chosen. For example, movie files, music files, text files, games, or software application programs can be selected.

Once the download criteria have been established, the search module searches the network for appropriate data matching the download criteria. When the data has been identified, the downloading starts.

After all the data has been downloaded, the data is automatically written to a storage device or storage medium. For example, the data could be written to a cd-rom or dvd-rom.

The present invention further comprises a filter module for establishing filter criteria. The filter module extends the capabilities of the download criteria by further identifying, excluding, or defining the data to be downloaded.

Additionally, a batch processing module is included for batch processing multiple download criteria preferences.

The individual download criteria preference files have an associated desktop icon that allows a user to start the automatic download and write to storage system with a single or double mouse click. Similarly, an icon associated with the batch processing preferences allows a user to start batch processing with a single or double mouse click.

These and other objectives of the present invention will become obvious to those of ordinary skill in the art after reading the following detailed description of preferred embodiments.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

FIG. 2A is a flowchart illustrating the basic operation of the automatic download and write to storage system with download criteria setup according to an embodiment of the present invention;

FIG. 2B is a flowchart illustrating the basic operation of the automatic download and write to storage system with download criteria and filter setup according to an embodiment of the present invention;

FIG. 4 is a drawing illustrating the download criteria setup options page according to an embodiment of the present invention;

DESCRIPTION OF THE PREFERRED EMBODIMENTS

Figure 1:
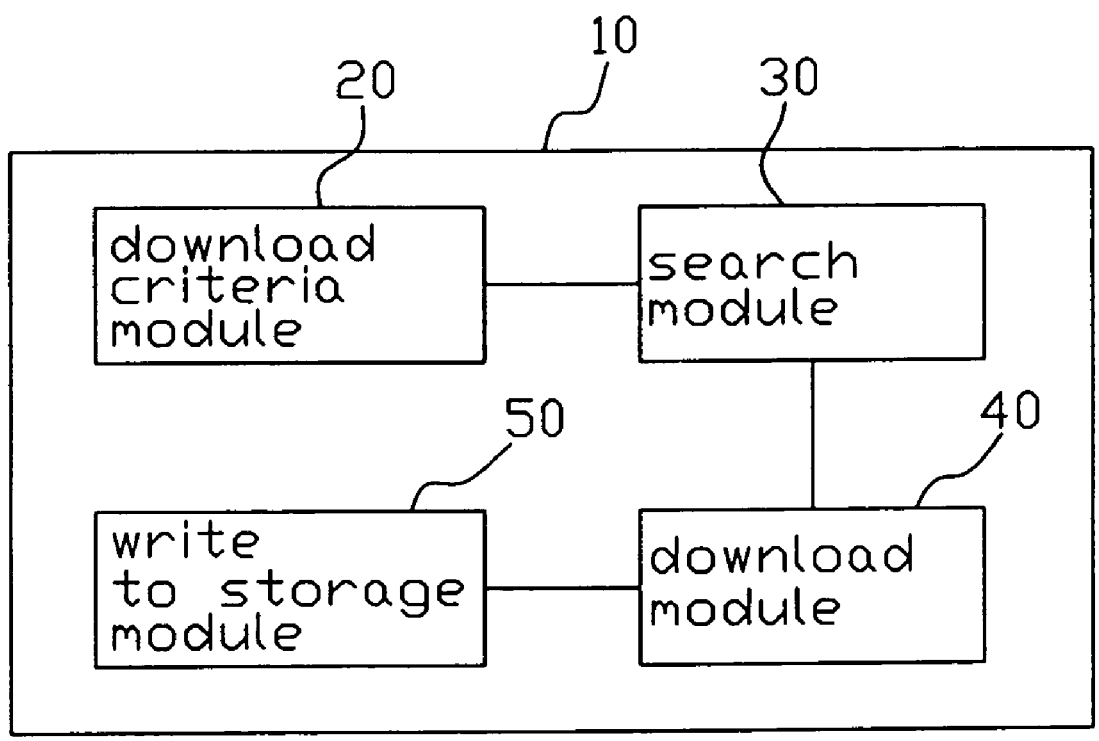
FIG. 1 is a block diagram illustrating an automatic download and storage write system according to an embodiment of the present invention.

Reference will now be made in detail to the preferred embodiments of the present invention, examples of which are illustrated in the accompanying drawings. Wherever possible, the same reference numbers are used in the drawings and the description to refer to the same or like parts.

Refer to FIG. 1, which is a block diagram illustrating an automatic download and storage write system according to an embodiment of the present invention.

As shown in FIG. 1, the automatic download and storage write system 10 of the present invention basically comprises a setup download criteria or preferences module 20, a search module 30, a download module 40, and a write to storage module 50.

In the download criteria setup or preferences module 20, choices of options or download criteria are selected. For example, if the desired data to be retrieved is current sports news, the download criteria could comprise web site addresses, author name, team name, sport type, region, date, player name, etc. In this example, the user can select from a menu, check selection boxes, or input the data directly into a blank field.

When the user has completed inputting the download criteria the actual searching and downloading can begin. The user simply clicks on an onscreen button and the searching module 30 and downloading module 40 begin operating. Alternatively, the user can select a start time or schedule a start time that allows the downloading to occur at a specified time. For example, downloading could be scheduled to occur while the user is asleep or away from the computer. In this way, the downloaded data can be written to the storage medium and be ready when the user returns.

The search module 30 comprises a built-in search engine or can utilize an Internet search engine. The search engine provides the location or address of suitable data according to the download criteria. The search engine results are stored in a file for use by the download module 40. These results are typically the Uniform Resource Locators (URL) which are identifiers indicating the address or location on the network of the data to be retrieved. If the user has requested information such as text information from a web site, the search engine stores the URL of the appropriate web site or sites. Alternatively, if the user has requested files such as a movie file, the search engine stores the URL with file name of the appropriate files.

After the search engine has stored the results, the download module 40 begins automatic downloading of the appropriate data. The download module 40 continues downloading until all data from the search results has been downloaded. Following downloading, the write to storage module 50 automatically writes the downloaded data to storage.

Refer to FIG. 2A, which is a flowchart illustrating the basic operation of the automatic download and write to storage system with download criteria setup according to an embodiment of the present invention.

As shown in FIG. 2A, the automatic download and write to storage system 200 begins by setting up the download criteria 205. When the preferences have been set up, the user clicks on the go or start button 210. Next, the network searching occurs 215 and the downloading begins 220. When the requested data has been downloaded, the data is automatically written to storage 225.

Refer to FIG. 2B, which is a flowchart illustrating the basic operation of the automatic download and write to storage system with download criteria and filter setup according to an embodiment of the present invention.

As shown in FIG. 2B, the operation is similar to that shown in FIG. 2A with the addition of setting up filter criteria 207. After pressing go or start 210, the searching begins 215 utilizing the download criteria and filter criteria.

Figures 3A, 3B:
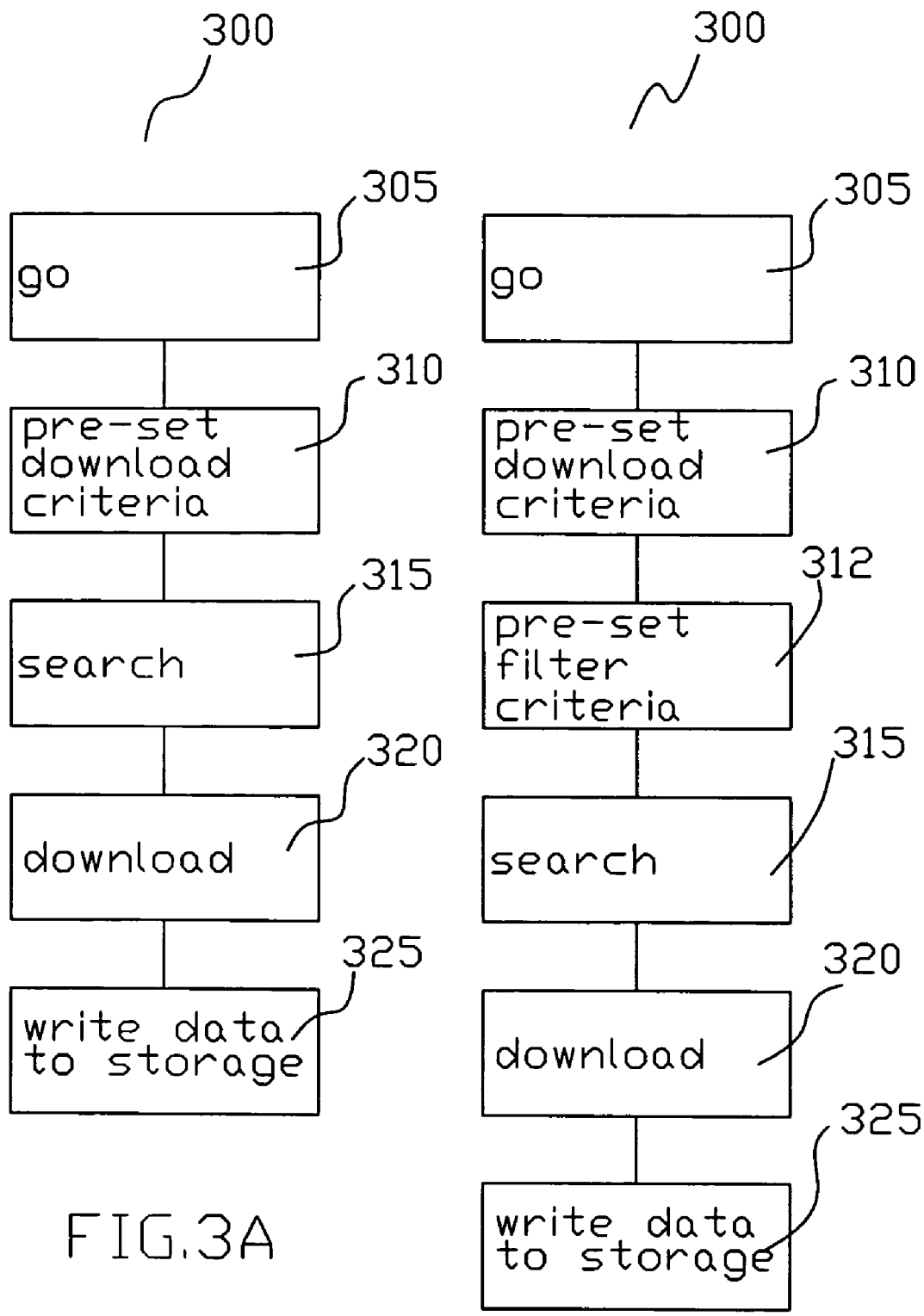
FIG. 3A is a flowchart illustrating the one click operation of the automatic download and write to storage system with pre-set download criteria according to an embodiment of the present invention.
FIG. 3B is a flowchart illustrating the one click operation of the automatic download and write to storage system with pre-set download criteria and pre-set filter criteria according to an embodiment of the present invention.

Refer to FIG. 3A, which is a flowchart illustrating the one click operation of the automatic download and write to storage system with pre-set download criteria according to an embodiment of the present invention.

In situations where the download criteria has been saved as a preset, the operation of the system 300 can be accomplished with a single click of the go or start button 305. After clicking the go or start icon 305, the pre-set download criteria is loaded 310 and the searching 315 and downloading 320 start. After which the data is automatically written to storage 325.

Refer to FIG. 3B, which is a flowchart illustrating the one click operation of the automatic download and write to storage system with pre-set download criteria and pre-set filter criteria according to an embodiment of the present invention.

Similar to the operation illustrated in FIG. 3A, the system operation 300 shown in FIG. 3B comprises the addition of loading of pre-set filter criteria 312.

Obviously there are constraints due to the size of memory or storage. To prevent memory overload or running out of storage, the user can specify in the download criteria the maximum or minimum file size, total download data size, or remaining memory or storage size. For example, if the user desires the download data to be burnt to a cd-rom, the user can specify that the maximum total download data size be less than 700 Mb. In this way, all the downloaded data can fit on a single cd-rom.

Alternatively, in a system with a large hard disc drive, the user could specify a total size up to the capacity of the hard drive. An advantage of the present invention is that the downloaded data can be stored in a variety of storage means. For example, the data could be stored on a fixed memory storage such as a hard drive or can be written to a removable storage media such as a cd-rom, dvd-rom, flash memory card, portable hard drive, optical drive, zip drive or other type of storage systems. Additionally, the data can be written to multiple storage media. For example, 2 gigabytes of data can be written to three cd-roms. Furthermore, the data could be stored on a remote computer or storage system that is connected to the host computer via a network.

As an example, a user could setup the download criteria on a home computer and specify the storage system to be connected to an office computer. In this way, the desired data could be completely downloaded and stored by the time the user gets to the office.

Typically, the user would prefer the data to be written to a removable storage medium for convenience and portability. In this situation, the downloaded data can be stored temporarily on a hard drive and written to the removable storage after all data has been downloaded. Alternatively, the data can be written to the storage medium as it is downloaded.

In some of the above examples, the download criteria were set up immediately prior to searching and downloading. However, the download criteria can also be reused. In this embodiment the user simply clicks on the download icon and the searching and downloading commences using the previous download preferences. Furthermore, multiple download criteria preferences can be established. For example, a user could have one preference file for downloading news, one for downloading music files, and another for downloading games. Flexibility also allows multiple user download criteria configurations.

In another embodiment of the present invention, the automatic download and storage write system comprises a filter component. The filter component can be included in the download criteria component or be a separate component. The filter component is used for setting specific criteria for filtering the data. In the filter component the user can select such options as time, date, file size, content, content type, content rating, revision, etc. Filtering allows for in-depth and flexible settings for the download data. For example, a user could setup a filter so that .jpg, .png, and .gif image file types would be downloaded but .bmp and .tif image types would not be downloaded. The filter component allows Boolean expressions to further specify the download criteria.

The automatic download and storage write system of the present invention can also act as an offline reader or browser. In this way, a user can specify a web site or multiple web sites to be downloaded. Additionally, the depth, number of levels, number of pages, text only, file types, etc. of the web site can be specified. In this mode, the first or home page of the requested web site is downloaded. After this, each hyperlinked page contained in the first page is downloaded until the specified level is reached. As a result, a mirror of the web site can be created for viewing when not connected to the Internet.

The data can also be written as a text-only version for use with a PDA, mobile phone, or other type of viewer incapable of viewing data in hypertext format.

When the desired data is information based, the present invention searches the Internet or other network for appropriate references to the desired information. However, the present invention can also search and download data from file transfer protocol (FTP) servers or pier-to-pier networks. For example, if the user desires movies about basketball, the present invention will search multiple FTP servers and download the appropriate movies. Additionally, all types of networks can be searched for a specific file name.

Refer to FIG. 4, which is a drawing illustrating the download criteria setup options page according to an embodiment of the present invention.

As shown in FIG. 4, the download criteria setup options page 400 is displayed when the system first runs or at any time the user wants to edit existing preferences or add a new preference.

The download criteria comprise an exhaustive list of options to clearly define what data is to be downloaded. For example, the user can load a preference preset that comprises previously setup criteria. That is to say multiple preferences can be stored so that different download definitions can be utilized.

Additionally, options such as network addresses or URLs, media types, file name, keywords, etc. can be defined. Furthermore, maximum and minimum file sizes can be stipulated. Also, the number of keywords or keyword count can be selected so that items appearing at the top of the search engine results can be downloaded first.

In order to add further usability to the system, an option to reformat the data to other formats is included. For example, if the original downloaded data is from an Internet website in .html format, the data can be reformatted into another format such as .txt or text only format. As another example, if the download data is a movie in .mpg format, the data can be reformatted into another format such as .wmv or avi format. Obviously, the system comprises the option to reformat or convert numerous formats other than the examples listed.

The system of the present invention further comprises the ability to allow the user to start the automatic downloading and writing at a scheduled time.

For convenience, the system of the present invention can also download mirrors of websites for offline browsing. The depth or number of levels of the website can also be defined.

In the download criteria setup page, the storage system for storing the data is selected. Since the storage or storage medium has a storage limit, the total maximum data or minimum remaining storage sizes can be defined.

If certain options are not pertinent, default parameters are used. For example, if no author is defined, the default author name is any.

In FIG. 4, the input method is displayed as blank fields. However, in other embodiments of the present invention, check boxes, drop down menus, or other types or combination of option selection type are used.

Once the preferences or download criteria are defined, the user has the option to either set up the filter criteria, save the download criteria as a preset, cancel, or begin automatic downloading and writing to storage by pressing the go or start button.

If the user chooses to save the download criteria as a preset, a dialog box will be shown for naming the preset. After naming the preset, an icon with the preset name is automatically added to the desktop of the computer. In this way, any time the user wishes to begin automatic downloading and writing to storage, they simply click on the icon and the operation begins.

Figure 5:
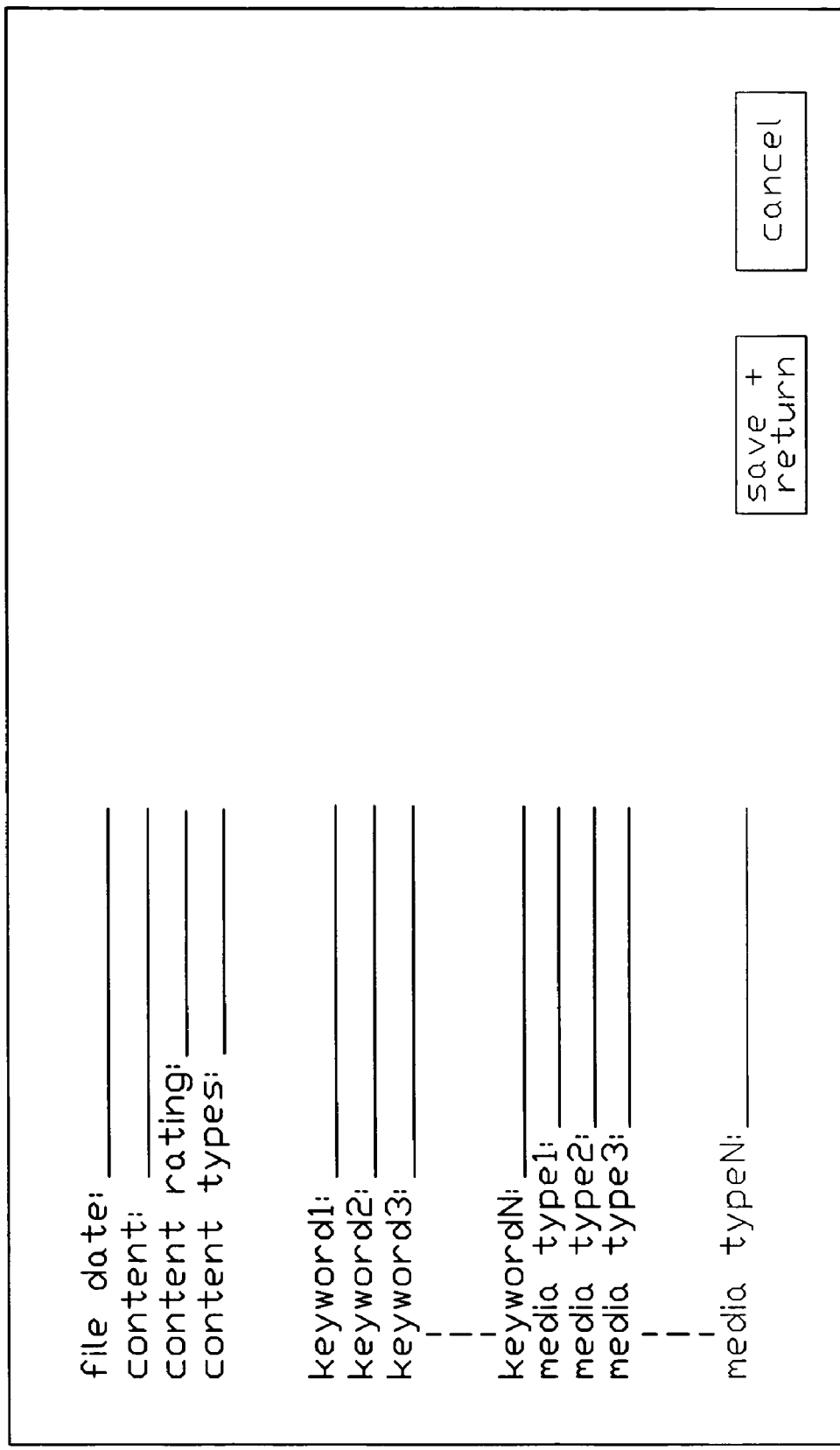
FIG. 5 is a drawing illustrating the filter criteria setup options page according to an embodiment of the present invention.

Refer to FIG. 5, which is a drawing illustrating the filter criteria setup options page according to an embodiment of the present invention.

If the user selects the option to edit the filter criteria, the filter criteria setup page 500 is displayed. As previously mentioned, the filter criteria can be a separate component or included in the same module as the download criteria component. Obviously all options included in the filter criteria shown in FIG. 5 could be included in the download criteria shown in FIG. 4. However, in the embodiment illustrated in FIG. 5, the filter criteria add further options to more distinctly identify or define the download criteria. For example, the file date, content, content types, content rating or other filter options are defined. The content rating allows or prevents sensitive content such as adult content or violent content to be downloaded.

Additionally, multiple keywords can be input and Boolean operators can be selected to operate between each keyword. An example of this would be keyword 1 AND keyword 2 NOT keyword 3 or, sports AND news NOT basketball. In this way, data containing sports and news but not containing basketball would be downloaded.

Similarly, the multiple media types can be input and Boolean operators can be selected to operate between each media type. For example, mpg AND avi OR wmv could be selected.

After the filter criteria is defined, the user can either cancel or save the filter criteria and return to the download criteria page. Obviously, other filter criteria can be included in the filter criteria setup.

Figure 6:
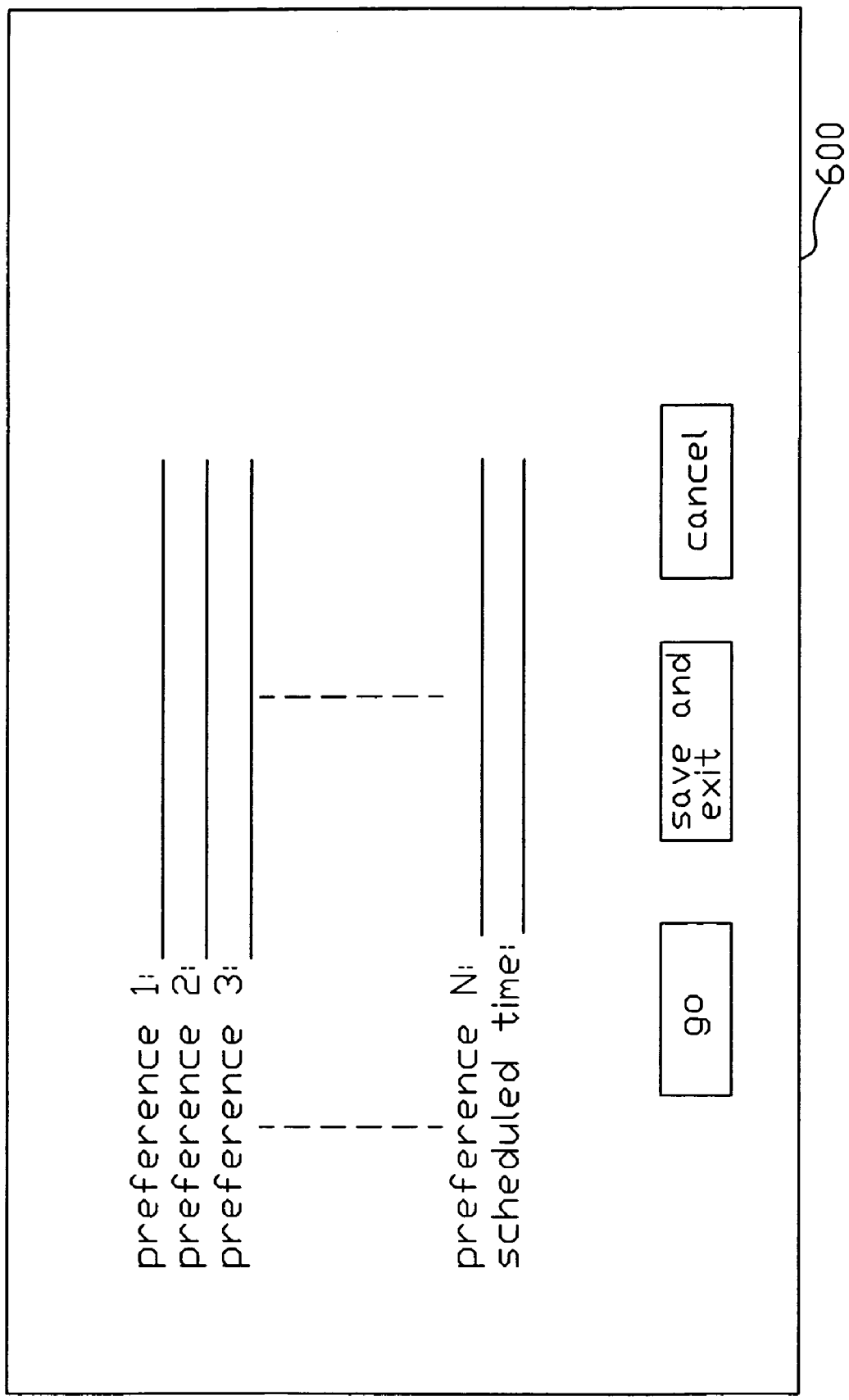
FIG. 6, which is a drawing illustrating a batch mode processor setup page according to an embodiment of the present invention.

Refer to FIG. 6, which is a drawing illustrating a batch mode processor setup page according to an embodiment of the present invention.

In another embodiment of the present invention as shown in FIG. 6, a batch mode processor module and batch mode processor setup page 600 are included. In this mode, multiple preferences or download criteria can be identified. For example, download criteria for news, sports, stock information, etc. could be selected for batch processing.

Additionally, the batch processing can be scheduled to occur at a scheduled time or date.

When the user has selected the preferences, they can either cancel, save the batch mode preferences and exit, or press go or start and the batch processing will begin.

A batch process icon is initially placed on the desktop. The first time the batch processing runs, the batch processing preference page will be displayed. If the user selects save and exit, the batch processing preferences are saved and associated with the batch process icon on the desktop. In this way, the user simply needs to click on the batch process icon and the batch processing begins. As a result, data matching the download criteria for all preferences listed in the batch processing preferences will be automatically downloaded and written to storage.

Information regarding the downloaded data can also be stored in a file, for example a log file. In this way, a record of data that has been downloaded can be maintained.

The download criteria, filter criteria, and downloaded data information can be stored as one or multiple files or cookies on the computer. If the system is supported or partly supported by advertising, the files or cookies can be utilized to further extend or adapt the system for a particular user. For example, if the user often downloads data regarding music, appropriate advertising could be displayed. Alternatively, the data to be downloaded can be selected according to the user's download habits. This personalization further enhances the automatic download and write to storage system of the present invention.

It will be apparent to those skilled in the art that various modifications and variations can be made to the present invention without departing from the scope or spirit of the invention. In view of the foregoing, it is intended that the present invention cover modifications and variations of this invention provided they fall within the scope of the invention and its equivalent.

What is claimed is:

1. A download and storage write system encoded on a computer readable medium, comprising:
    establishing a computer processor;
    setting download criteria for inputting the download criteria into the processor;
    searching a computer accessible network based on the download criteria;
    specifying a number of levels of web sites; automatically downloading and storing all data files, singly or in a batch mode, according to the download criteria, wherein when the data files consist of web sites, the first page of each of said web sites is optionally downloaded, and each hyperlink contained in the first page is also optionally downloaded until the specified level is reached to enable offline browsing; and
    writing all data files to the storage, wherein said data files are reformatable, such that a data file of one type is optionally reformatted into a data file of another type containing the same data.

2. The download and storage write system of claim 1, wherein the data files are downloaded and written to the storage automatically.

3. The download and storage write system of claim 1, wherein downloading and writing are accomplished with a single click.

4. The download and storage write system of claim 1, the download criteria comprising:
    file type, file name, file size, author, subject, website address, file transfer protocol address, filter settings, keyword count, database rank, date, media type, or a combination of these.

5. The download and storage write system of claim 1, further comprising:
    filtering data based on the download criteria or filtering criteria.

6. The download and storage write system of claim 5, the filtering criteria comprising:
    author, date, revision, file, file type, file size, content, content type, content rating, or a combination of these.

7. The download and storage write system of claim 1, further comprising:
    processing a plurality of download criteria preferences.

8. The download and storage write system of claim 1, wherein the storage comprises a removable storage device or removable storage medium.

9. The download and storage write system of claim 1, wherein the storage comprises:
    dvd-rom, cd-rom, flash memory, hard disc, optical disc, zip disc, or their respective devices.

10. The download and storage write system of claim 1, the computer accessible network comprising a local area network, Internet, peer to peer network, file transfer protocol network, wide area network, wireless network, or a combination of these.

11. The download and storage write system of claim 1, wherein the storage writes a multi-session disc, multiple discs, or closed disc.

12. The download and storage write system of claim 1, wherein searching, downloading, and writing occur according to a scheduled time.

13. The download and storage write system of claim 1, wherein the download criteria is stored in at least one cookie.

14. The download and storage write system of claim 1, wherein information regarding downloaded data is stored in a file.

15. A download and storage write system encoded on a computer readable medium comprising:
    establishing a computer processor;
    searching a computer accessible network based on download criteria;
    specifying a number of levels of web sites; automatically downloading and storing all data files, singly or in a batch mode, according to the download criteria wherein when the data files consist of web sites, the first page of each of said web sites is optionally downloaded and each hyperlink contained in the first page is also optionally downloaded until the specified level is reached to enable offline browsing; and
    writing all data files to the storage, wherein said data files are reformatable, such that a data file of one type is reformatted into a data file of another type containing the same data.

16. The download and storage write system of claim 15, wherein the download criteria are pre-set.

17. The download and storage write system of claim 15, wherein the data files are searched for, downloaded, and written to the storage automatically.

18. The download and storage write system of claim 15, wherein searching, downloading, and writing are accomplished with a single click.

19. The download and storage write system of claim 15, the download criteria comprising:
    file type, file name, file size, author, subject, website address, file transfer protocol address, filter settings, keyword count, database rank, date, media type, or a combination of these.

20. The download and storage write system of claim 15, further comprising:
    setting download criteria.

21. The download and storage write system of claim 15, further comprising:
    filtering data based on the download criteria or filtering criteria.

22. The download and storage write system of claim 21, the filtering criteria comprising:
    author, date, revision, file, file type, file size, content, content type, content rating, or a combination of these.

23. The download and storage write system of claim 15, further comprising:
    processing a plurality of download criteria preferences.

24. The download and storage write system of claim 15, wherein the storage comprises a removable storage device or removable storage medium.

25. The download and storage write system of claim 15, wherein the storage comprises:

dvd-rom, cd-rom, flash memory, hard disc, optical disc, zip disc, or their respective devices.

26. The download and storage write system of claim 15, the computer accessible network comprising a local area network, Internet, peer to peer network, file transfer protocol network, wide area network, wireless network, or a combination of these.

27. The download and storage write system of claim 15, wherein the storage writes a multi-session disc, multiple discs, or closed disc.

28. The download and storage write system of claim 15, wherein searching, downloading, and writing occur according to a scheduled time.

29. The download and storage write system of claim 15, wherein the download criteria is stored in at least one cookie.

30. The download and storage write system of claim 15, wherein information regarding downloaded data is stored in a file.

* * * * *